United States Statutory Invention Registration [19]

[11] Reg. Number: H294

Hiraizumi et al. [43] Published: Jul. 7, 1987

[54] SAW CHAIN GUIDE DEVICE FOR CHAIN SAW

[75] Inventors: Junichi Hiraizumi, Tokyo; Akira Nagashima, Kawasaki, both of Japan

[73] Assignee: Kioritz Corporation, Tokyo, Japan

[21] Appl. No.: 702,243

[22] Filed: Feb. 15, 1985

[30] Foreign Application Priority Data

Feb. 17, 1984 [JP] Japan ..... 59-21297

[51] Int. Cl.[4] ..... B23D 57/02; B23D 59/00; B27B 17/00

[52] U.S. Cl. ..... 30/383; 30/381

[58] Field of Search ..... 30/381, 382, 383, 384, 30/385, 386, 387

[56] References Cited

U.S. PATENT DOCUMENTS 3,414,026 12/1968 Merz .
3,870,125 3/1975 Gorski ..... 30/383
3,967,378 7/1976 Arff et al. ..... 30/383

*Primary Examiner*—Deborah L. Kyle
*Assistant Examiner*—Michael J. Carone
*Attorney, Agent, or Firm*—Browdy and Neimark

[57] ABSTRACT

A saw chain guide device for a chain saw in which an end face of each of side plates disposed adjacent to a drive sprocket of the saw chain terminates extremely adjacent to a tooth tip circle of the drive sprocket of the saw chain, and an end edge portion extending beyond the end face and along the tooth tip circle of the toothed sprocket is integrally formed with at least one of the side plates confronting outerside of the chain saw.

2 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SAW CHAIN GUIDE DEVICE FOR CHAIN SAW

BACKGROUND OF THE INVENTION

The present invention relates to a guide device for a saw chain of a chain saw.

In a conventional chain saw, a saw chain is likely to be taken off or displaced from a free travelling path along which the saw chain is to travel apart from a drive sprocket to a guide bar in operation. As a result, there are problems in which a sawing work must be stopped and some other associated components would be damaged.

SUMMARY OF THE INVENTION

An object of the invention is to overcome the above-mentioned defects inherent to a chain saw of the prior art and to provide a saw chain guide device for a chain saw, which is easy to manufacture and assemble and simple in structure.

According to the present invention, in a chain saw having a guide bar disposed adjacent to a drive sprocket for a saw chain of the chain saw and a pair of side plates mounted on opposite sides of the guide bar, respectively, for guiding the saw chain travelling along side edges of the guide bar, there is provided a saw chain guide device characterized in that an end face of each of the side plates disposed adjacent to the drive sprocket of the saw chain terminates extremely adjacent to a tooth tip circle of the drive sprocket of the saw chain, and that an end edge portion extending beyond the end face and along the tooth tip circle of the toothed sprocket is integrally formed with at least one of the side plates confronting outerside of the chain saw. Therefore, with such a structure that the end face of each of the side plates disposed adjacent to the drive sprocket of the saw chain terminates extremely adjacent to a tooth tip circle of the drive sprocket of the saw chain, the saw chain freely travelling from the drive sprocket to the guide bar is positively guided to prevent the chain from being taken off from the travelling path, and at the same time, with such a structure that the end edge portion extending beyond the end face and along the tooth tip circle of the toothed sprocket is integrally formed with at least one of the side plates confronting outside of the chain saw, the saw chain may be further positively prevented from being taken off from the travelling path.

PREFERRED EMBODIMENT OF THE INVENTION

Figure 1:
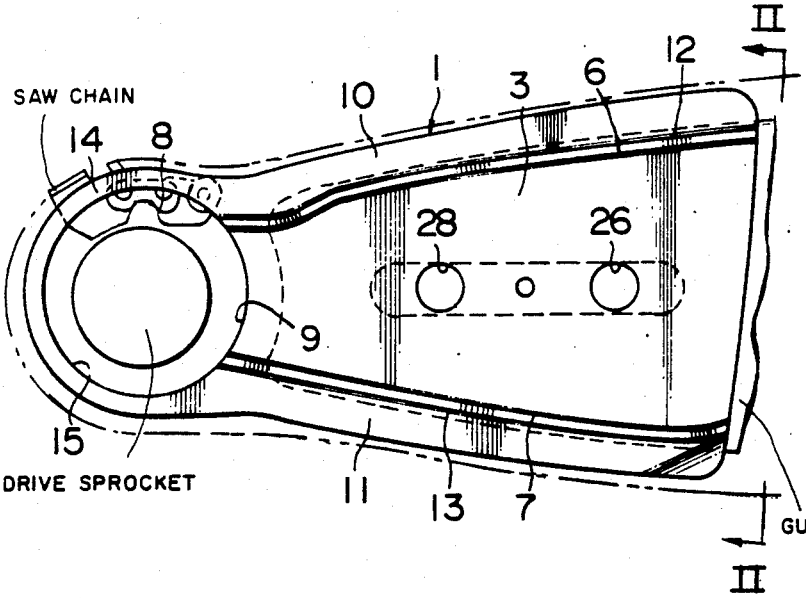
FIG. 1 is a side view showing an example of a side plate of a saw chain guide device for a chain saw in accordance with the present invention.
Figure 2:
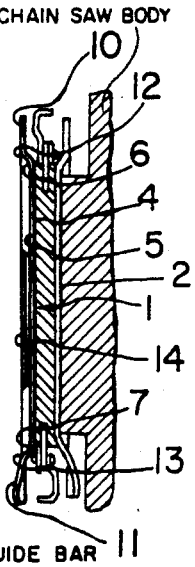
FIG. 2 is an end elevational view showing the side plate shown in FIG. 1.
Figure 3:
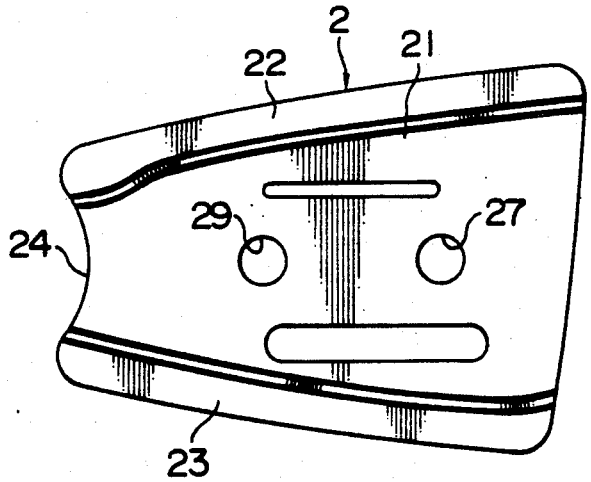
FIG. 3 is a side view showing the other side plate of the saw chain guide device.

An embodiment of the invention will now be described with reference to the accompanying drawings. FIGS. 1 and 2 are side and end elevational views showing a side plate 1 to be mounted on an outer portion of a guide bar (not shown) of a chain saw. Similarly, FIG. 3 is a side view showing an associated side plate 2 to be mounted on an inner portion of the guide bar. The side plates 1 and 2 are fixedly secured to opposite sides of an end of the guide bar adjacent to a drive sprocket of a saw chain (not shown).

The side plate 1 which confronts the outside of the chain saw is made of a material, having a relatively high hardness and a wear resistance, such as a steel plate or a steel plate made partly of plastic. The side plate 1 has planar side surfaces 4 and 5 in its central portion 3. Upper and lower side edges 6 and 7 of the central portion 3 are formed so as to have configurations substantially identical with those of upper and lower side edges of the guide bar to which the side plate 1 is to be secured. The side plate 1 has at one end a circular bore 8 to be described later. The central portion 3 is formed so as to gradually decrease its width in the vertical direction toward one end at which the circular bore 8 is formed and to define a part of the circular bore 8 with an end face 9. Also, an adjacent end of the guide bar is formed so as to be identical with the configuration of the end face 9 of the central portion 3. The circular bore 8 is formed concentrically with respect to the tooth tip circle of the drive sprocket and has a diameter somewhat greater than that of the tooth tip circle of the sprocket. The end face 9 is formed extremely adjacent to the tooth tip circle of the drive sprocket.

Side edge portions 10 and 11 are integrally formed with the side plate 1 at the outside of the upper and lower side edges 6 and 7. As best shown in FIG. 2, the side edge portions 10 and 11 are bent from bent portions 12 and 13 toward the side surface 4 of the central portion 3 so that the side edge portions 10 and 11 are deviated from the side surface 5 of the central portion 3 to the outerside of the chain saw body. Also, from the side edge portions 10 and 11, there is integrally formed an end edge portion 14 extending from the end face 9 of the central portion 3 around the circular hole 8. An inner end face 15 of the end edge portion 14 defines the circular hole 8 together with the end face 9 of the central portion 3.

On the other hand, the side plate 2 to be mounted on the chain saw side of the guide bar has a form substantially symmetrical with and identical with that of the above-described side plate 1. In other words, a central portion 21 of the side plate 2 corresponds to the central portion 3 of the outer side plate 1, and side edge portions 22 and 23 of the side plate 2 correspond to the side edge portions 10 and 11 of the outer side plate 1, respectively.

It is however noted that the side edge portions 22 and 23 of the side plate 2 is bent and formed so that when the side plates 1 and 2 are mounted on the guide bar as described later, the side edge portions 22 and 23 are deviated toward the inside of the chain saw body opposite the side edge portions 10 and 11 of the side plate 1.

Further, the inner side plate 2 has no end edge portion corresponding to the end edge portion 14 of the outer side plate 1 and terminates at an end face 24 corresponding to the end face 9 of the central portion 3 of the outer side plate 1.

The thus constructed side plates 1 and 2 are mounted on opposite sides of the guide bar of the chain saw. At this time, the side plate 1 having the circular hole 8 is located at the outerside of the chain saw body and the side plate 2 is located at the innerside of the chain saw body. At the same time, the side surface 4 of the central portion 3 of the side plate 1 and the side surface 25 of the central portion 21 of the side plate 2 are disposed in contact with the guide bar. A pair of bolts are passing through holes 26 and 27; and 28 and 29 formed in the central portions 3 and 21 of the side plates 1 and 2, respectively, so that the guide bar and the side plates 1 and 2 are mounted on the chain saw body.

With such an arrangement, a chain passage is defined by the side edge portions 10 and 22; and 11 and 23 of the side plates 1 and 2, and the end edge portion 14 of the side plate 1 guidingly restricts an outer side of a part of the saw chain engaging with the drive sprocket. At the same time, the end face of the guide bar and the end faces 9 and 24 of the central portions 3 and 21 of the side plates 1 and 2 are arranged extremely close to the tooth tips of the drive sprocket, whereby the saw chain travelling from the drive sprocket to the guide bar is positively guided and completely prevented from being taken off, ensuring safety work for the operator. Also, if desired, the end edge portion corresponding to the end edge portion 14 of the outer side plate 1 may be provided to the inner side plate 2.

What is claimed is:

1. A saw chain guide device for a chain saw comprising a guide bar disposed adjacent to a drive sprocket for a saw chain and first and second side plates having generally planar body portions and mounted on opposite sides of the guide bar, respectively, for guiding a saw chain travelling along side edges of said guide bar, said first side plate having said drive sprocket disposed between itself and said second side plate, said first side plate defining a circular bore concentric with and having a diameter slightly greater than a tooth tip circle of said drive sprocket, said circular bore having an end edge portion about the periphery thereof, wherein an end face of each of said sides terminates adjacent to a tooth tip circle of the drive sprocket of the saw chain, and said end edge portion extending about the periphery of said circular bore terminates in close proximity to said tooth tip circle of the toothed sprocket and is integrally formed with said first side plate and each said side plate (1,2) having upper and lower edge portions (10,11 and 22,23) flanged from the general plane of said side plate body portions away from said guide bar.

2. A saw chain guide device in accordance with claim 1 wherein said upper and lower edge portions (10,11 and 22,23) are generally parallel to their respective body portions (3,21) for a portion of their lengths.

* * * * *